3,167,593
PRODUCTION OF OLIGOMERS OF 1,3-DIENES
Herbert Mueller, Ludwigshafen (Rhine), Germany, assignor to Badische Anilin- & Soda-Fabrik Aktiengesellschaft, Ludwigshafen (Rhine), Germany
No Drawing. Filed Dec. 22, 1959, Ser. No. 861,170
Claims priority, application Germany, Dec. 27, 1958,
B 51,585
2 Claims. (Cl. 260—666)

This invention relates to a process for the production of liquid oligomers of 1,3-dienes in the presence of new catalysts.

By "oligomers" as used herein there are to be understood open-chain or cyclic compounds which are made up of a small number of 1,3-diene molecules, for example, 3 to 10 molecules.

It is known that catalysts which convert 1,3-dienes into cyclic hydrocarbons, such as cyclododecatriene-(1,5,9) or cyclo-octadiene-(1,5), are obtained from aluminum alkyls or alkylaluminum chlorides and chromium or titanium halides. The yield of cyclic hydrocarbons are about 80% of the theory, the remainder of the initial material being converted for the most part into high molecular weight gum-like polymers. This renders difficult the operation of the process, especially the continuous operation, inasmuch as the said polymers are insoluble in the usual organic solvents, such as benzene or paraffin hydrocarbons, but swell therein so that the whole reaction mixture is converted into a highly viscous mass which is difficult to handle.

A further disadvantage of the known method is that chromium or titanium halides are required and these are relatively difficultly accessible.

It is an object of the present invention to provide a process whereby the formation of the said gum-like polymers is suppressed.

Another object of the invention is to provide a process whereby the cyclic trimers of 1,3-dienes are obtained in better yields.

A further object of the invention is to provide a process which can be carried out in the absence of titanium and chromium halides which are relatively difficultly accessible.

These and other objects and advantages of the invention are achieved by treating a 1,3-diene with a catalyst obtainable from chromium (VI) oxide, an acid derivative and an aluminum organyl.

According to the new process, chromium halides are replaced by the less expensive chromium (VI) oxide and readily accessible acid derivatives. A further advantage resides in the fact that the proportion of high molecular gummy polymers is small and this facilitates carrying out the process continuously. Instead, there is formed a larger amount of cyclic, mainly trimeric, compounds or higher molecular weight strongly unsaturated oligomers, which in general are also cyclic, but still liquid and soluble in the usual solvents. They have a boiling range of from about 80° to about 220° C., especially 90° to 170° C., at a pressure of $10^{-4}$ to $10^{-6}$ mm. Hg. These substances, of which the molecular weight is higher than that of trimers and which are hereinafter referred to as higher oligomers, increase the viscosity of the reaction mixture only inconsiderably and are valuable initial materials for further reactions.

It is an advantage of the new process that by varying the reaction conditions it is possible to obtain either the cyclic trimers or the higher oligomers of the initial materials. When preferential formation of cyclic trimers is desired, these may be obtained in better yields than by the known methods. In general, the trimers, similarly as with the known methods, are obtained in the form of a mixture of geometrical isomers. Thus from butadiene-(1,3) there are formed trans-trans-trans-cyclododecatriene-(1,5,9) and trans-trans-cis-cyclododecatriene-(1,5,9). This is not a disadvantage, however, because the substances usually are hydrogenated to cyclododecene or cyclododecane, unitary products being thereby formed.

The preferred 1,3-diene is butadiene-(1,3). It is however also possible to react with good results butadiene-(1,3) which are substituted once or twice by lower alkyl radicals with up to about 4 carbon atoms and especially by methyl or ethyl radicals, or in which the butadiene structure is built into a cycloaliphatic ring preferably having 6 carbon atoms. Suitable 1,3-dienes are for example isoprene, 2-ethylbutadiene-(1,3), piperylene, 2,3-dimethylbutadiene-(1,3) and cyclohexadiene-(1,3).

The process is advantageously carried out in a solvent which is inert under the conditions of the reaction. Examples of suitable solvents are aliphatic, cycloaliphatic or aromatic hydrocarbons, possibly chlorinated, such as pentane, hexane, cyclohexane, benzene, toluene, xylene, chlorbenzene and ortho-dichlorbenzene. The relative proportions of the reaction products can be influenced by the choice of solvent. Thus the formation of trimers of the initial material is favored in aromatic solvents and especially in aromatic hydrocarbons under otherwise identical conditions.

Suitable acid derivatives are above all organic or inorganic acid halides, especially acid chlorides, organic acid anhydrides or organic acid amides. The organic acid chlorides may be derived from saturated or unsaturated aliphatic or cycloaliphatic, and also from araliphatic or aromatic carboxylic acids. It is advantageous to use saturated aliphatic acid chlorides with up to about 20 carbon atoms, aliphatic dicarboxylic acid dichlorides and the chlorides of mononuclear aromatic monocarboxylic acids. Suitable inorganic acid halides are especially the chlorides of oxyacids of sulfur or of phosphorus. Examples of acid chlorides which may be used are: acetyl chloride, propionyl chloride, butyric acid chloride, stearic acid chloride, benzoic acid chloride, adipic acid chloride, phosphorus trichloride, phosphorus oxychloride and thionyl chloride.

Of the organic acid anhydrides it is preferable to use those which are derived from lower saturated aliphatic carboxylic acids with up to about 4 carbon atoms or from saturated aliphatic dicarboxylic acids with 4 or 5 carbon atoms. Individual examples are: acetic anhydride, propionic anhydride, succinic anhydride and glutaric anhydride.

Of the organic acid amides, those are most suitable which are derived from lower saturated aliphatic carboxylic acids with up to about 4 carbon atoms and which are substituted twice at the nitrogen atom, or N-substituted lactams with 5 to 7 ring members. The substituents on the nitrogen atom are preferably lower alkyl radicals with up to 4 carbon atoms or common members of a heterocyclic 5- or 6-membered ring which includes the nitrogen atom. Examples of such acid amides are: N,N-dimethylformamide, N,N-diethylformamide, N,N-dibutylformamide, N-formylpyrrolidine, N,N-ethylacetamide, N,N-dimethylpropionamide, N-methylpyrrolidone and N-methylcaprolactam.

Of the aluminum organyls there are used especially alkyl aluminum compounds, such as dialkyl aluminum hydrides or aluminum trialkyls. There are generally used those aluminum alkyls which contain lower alkyl radicals with up to 5 carbon atoms. It is also possible to use aluminum aryls, especially aluminum triphenyl, for the production of the catalyst. Suitable aluminum alkyls include diethyl aluminum hydride, dipropyl aluminum hydride, di-isobutyl aluminum hydride, aluminum triethyl, aluminum tri-isobutyl and aluminum tripropyl.

The catalyst need be used only in a small amount, for example 0.5 to 10% by weight with reference to the 1,3-diene. The chromium(VI) oxide and the acid derivative are preferably used in a molar ratio between 1:3 and 3:1, while the molar ratio of chromium(VI) oxide to aluminium alkyl advantageously lies within the limits 1:2 and 1:15. The proportion of trimers and higher oligomers can also be varied by variation of the relative proportions of the constituents from which the catalyst is prepared. Thus relatively large amounts of higher oligomers of 1,3-dienes are obtained when with a constant amount of the acid derivative, the chromium(VI) oxide and the aluminum organyl are used in mol ratios of from about 1:1 to 1:3. With a greater excess of aluminum organyl, as for example beyond a ratio of 1:4, more trimer of the 1,3-diene is formed. If on the other hand the amount of chromium(VI) oxide used is kept constant, there may be achieved a good yield of higher oligomers for example when the molar ratio of acid derivative to aluminum organyl lies between about 1:1 and 1:3, whereas a greater excess of aluminum organyl, for example beyond the ratio 1:4, again leads to preferential formation of trimers. For example by working with a molar ratio of chromium(VI) oxide to acid derivative to aluminum alkyl of 1:1:4, mainly cyclic trimers of the initial material are obtained. With a molar ratio of the said substances of for example 1:0.5:3, on the other hand, higher oligomers are obtained in fairly large amounts.

The process may be carried out within a wide range of temperatures, namely between about $-50°$ and $+150°$ C. The preferred reaction temperatures lie between 20° and 80° C.

Since the catalysts are very sensitive it is recommended that absolute solvents should be used and the reaction carried out under the atmosphere of an inert gas, such as nitrogen or argon.

The reaction as a rule is carried out at atmospheric pressure but it is also possible to work under reduced or increased pressure. Increased pressures, for example of up to 10 atmospheres, are sometimes necessary especially when using initial materials of low boiling point and at elevated reaction temperatures.

In the practice of my invention, there is first of all formed the catalyst, usually by allowing the acid derivative to act on the chromium(VI) oxide and then adding the aluminum organyl. During the action of the acid derivative on the chromium(VII) oxide provision should preferably be made for the intimate mixing thereof, for example by treating the said materials, advantageously with the solvent to be used for the reaction, for some time, for example 1 to 10 hours, in a ball mill. The catalyst solution is ready for use after the aluminum organyl has been added. The reaction is strongly exothermic. The desired reaction temperature is maintained by regulating the supply of the initial materials and if necessary by cooling. The reaction temperature is preferably maintained for some time after the end of the supply of the initial materials in order to complete the reaction. The catalyst is then destroyed, for example by adding a small amount of a low molecular weight alcohol, and the reaction mixture worked up in the usual way, for example by shaking up with water and separating and distilling the organic phase.

The hydrocarbons obtainable according to this invention are valuable initial materials for organic syntheses. The higher liquid strongly unsaturated hydrocarbons are suitable for example as initial materials for the production of textile or mineral oil auxiliaries or as lacquer bases.

The following examples will further illustrate this invention but the invention is not restricted to these examples. The parts specified in the examples are parts by weight.

*Example 1*

0.78 part of acetyl chloride, 1 part of chromium(VI) oxide and 90 parts of benzene are ground in a ball mill for 10 hours. The solution formed is transferred to a reactor having a stirrer, reflux condenser, gas inlet pipe and thermometer and 5 parts of aluminum triethyl are added. Into the catalyst solution thus obtained, 115 parts of butadiene-(1,3) are led during 2 hours, the temperature being kept at 60° C. by cooling. After the end of the supply of butadiene, the reaction mixture is kept at the said temperature for another 5 hours.

The catalyst is destroyed by adding 10 parts of methanol and the mixture shaken up with 200 parts of 15% sulfuric acid. The organic phase is separated, dried with calcium chloride and, after the removal of the solvent, the residue is distilled under reduced pressure. There are obtained 1 part (i.e., 0.8% of the theory) of a mixture of cyclo-octadiene-(1,5) and 1 vinylcyclohexane-(3), 100 parts (i.e., 87% of the theory) of a mixture of trans-trans-trans-cyclododecatriene-(1,5,9) and trans-trans-cis-cyclododecatriene-(1,5,9), and also 14 parts (i.e., 12% of the theory), of higher strongly unsaturated hydrocarbons, which pass over mainly between 100° and 150° C. at $10^{-5}$ mm. Hg. The mean molecular weight of the product is 340, and the hydrogenation iodine number 410. The mixture probably contains mainly a cyclic hydrocarbon $(C_4H_6)_6$ with six double linkages.

*Example 2*

The procedure of Example 1 is followed but chlorbenzene is used as the solvent instead of benzene. The yield of cyclododecatriene-(1,5,9) is 82 parts, (i.e., 75% of the theory). There are also obtained 27 parts (i.e., 25% of the theory) of higher-boiling hydrocarbons having a boiling point of 110° to 160° C. at $10^{-5}$ mm. Hg and an iodine number of 450.

*Example 3*

The procedure of Example 1 is followed but iso-octane is used as the solvent. The yield of cyclododecatriene-(1,5,9) is 60% of the theory and that of higher-boiling unsaturated hydrocarbons 37% of the theory.

*Example 4*

A catalyst is prepared, as described in Example 1, from 5 parts of chromium trioxide, 2 parts of acetic anhydride, and 17 parts of aluminum triethyl while using 90 parts of benzene. 75 parts of butadiene-(1,3) are led into the mixture at 30° C. The product is worked up as in Example 1 and there are obtained 18 parts (i.e., 25% of the theory) of cyclododecatriene-(1,5,9) and 54 parts (i.e., 75% of the theory) of strongly unsaturated high boiling point hydrocarbons which for the most part pass over at 90° to 160° C. at $10^{-5}$ mm. Hg and have an iodine number of 408.

*Example 5*

A catalyst solution is prepared from 1 part of chromium trioxide, 1.2 parts of butyric acid chloride, 7 parts of aluminum triethyl and 90 parts of benzene in the way described in Example 1. 97 parts of butadiene-(1,3) are reacted at 60° C. There are obtained 58 parts (i.e., 60% of the theory) of cyclododecatriene-(1,5,9) and 21 parts (i.e., 22% of the theory) of a yellow strongly unsaturated hydrocarbon which distils at 80° to 100° C. at $10^{-5}$ mm. Hg and has the iodine number 480. The remaining 18% of the butadiene used reappears as gummy polymer.

*Example 6*

A catalyst solution is prepared from 0.5 part of chromium oxide, 1.2 parts of butyric acid chloride, 5 parts of diethyl aluminum hydride and 90 parts of benzene in the way described in Example 1. From 85 parts of butadiene-(1,3) there are obtained in the way described in Example 1, 30 parts (i.e., 35% of the theory) of cyclododecatriene-(1,5,9) and 42 parts (i.e., 50% of the theory) of an oily strongly unsaturated hydrocarbon with the iodine number 390. 14% of the butadiene used is converted into solid polybutadiene.

Example 7

A catalyst solution is prepared from 1 part of chromium oxide, 1.4 parts of benzoic acid chloride, 1 part of aluminum triethyl and 90 parts of benzene in the way described in Example 1. The further procedure of Example 1 is followed and there are obtained 20% of the theory of cyclododecatriene-(1,5,9) and 80% of the theory of a strongly unsaturated oil of the boiling point 80° to 100° C. at $10^{-4}$ mm. Hg and having the iodine number 425.

Example 8

A catalyst solution is prepared from 1 part of chromium (VI) oxide, 1.4 parts of phosphorus trichloride and 7 parts of aluminum triethyl in 80 parts of benzene. By working as described in Example 1 there is obtained a high-boiling strongly unsaturated oil of the boiling point 100° to 160° C. at $10^{-5}$ mm. Hg in a yield of 40% of the theory.

Example 9

A catalyst solution is prepared from 1 part of chromium (VI) oxide, 0.8 part of acetyl chloride and 4.5 parts of aluminum triethyl in 100 parts of benzene in the way described in Example 1. 60 parts of isoprene are added within one hour at 30° to 40° C. To complete the reaction, the mixture is kept at room temperature and at 60° C. for 3 hours. The mixture is further worked up as described in Example 1. There are obtained 19 parts (i.e., 32% of the theory) of a mixture of isomeric trimethylcyclododecatrienes-(1,5,9) of the boiling point 119° to 123° C. at 6 mm. Hg and the refractive index $n_D^{15}=1.5108$, and 33 parts (i.e., 55% of the theory) of a high boiling point unsaturated hydrocarbon which passes over between 100° and 170° C. at $10^{-5}$ mm. Hg and has an iodine number of 354. 6 parts (i.e., 10% of the theory) remain in the residue as non-distillable polyisoprene.

Example 10

1 part of chromium(VI) oxide, 0.08 part of acetyl chloride and 90 parts of benzene are ground in a ball mill for 8 hours. The suspension is supplied to a reaction vessel and 4.5 parts of aluminum triethyl are added. After introducing 24 parts of 2,3-dimethylbutadiene-(1,3) the mixture is heated for 60 hours at 60° C. The catalyst is destroyed in the usual manner and the mixture worked up by distillation. There are obtained 19 parts of trimeric 2,3-dimethylbutadiene-(1,3) having the boiling point 134 to 140° C. at 6 mm. Hg and the refractive index $n_D^{20}=1.4977$ as well as 2 parts of higher boiling oligomers. According to the infra-red and Raman spectra, molecular weight, elementary analysis and iodine number (determined by hydrogenation) the main product is in all probability 2,3,6,7,10,11 - hexamethyldodecatetraene-(1,5,7,11).

Example 11

Using the catalyst described in Example 10 there are reacted 30 parts of cyclohexadiene-(1,3) by heating for 15 hours at 60° C. There are obtained 10 parts of a bicyclic dimer of the initial material having the boiling point 73° to 75° C. at 5 mm. Hg. The balance of the cyclohexadiene-(1,3) remains unreacted.

Example 12

A catalyst suspension is prepared in the manner described in Example 10 from 1 part of chromium(VI) oxide, 0.8 part of acetyl chloride and 9 parts of aluminum-tri-n-butyl. Into the catalyst suspension butadiene-(1,3) is introduced for one hour at 50° to 60° C., and the mixture maintained at 50° C. for another two hours. By working as described in Example 1 there are obtained 60 parts, i.e., 85% of the theory, of cyclododecatriene-(1,5,9) and 6 parts of higher boiling oligomers of butadiene.

Example 13

A catalyst suspension is prepared as described in Example 1 from 90 parts of benzene, 1 part of chromium (VI) oxide, 0.7 part of dimethylformamide and 5 parts of aluminum triethyl. Into the suspension, butadiene-(1,3) is introduced for 2 hours at 50° to 55° C., 66 parts being reacted. The reaction mixture is stirred at the said temperature for another 5 hours and then worked up as described in Example 1. There are obtained 43 parts of cyclododecatriene-(1,5,9) and 21 parts of higher boiling oligomers of butadiene.

Example 14

A catalyst suspension is prepared as described above from 1 part of chromium(VI) oxide, 3 parts stearic acid chloride, 5 parts of aluminum triethyl and 90 parts of benzene. 86 parts of butadiene-(1,3) are reacted at 85° C. during an hour and there are obtained by working up as described above, 40 parts of cyclododecatriene-(1,5,9) and 34 parts of higher boiling oligomers of butadiene.

Example 15

A catalyst suspension is prepared as described in Example 1 from 1 part of chromium(VI) oxide, 1.9 parts of adipic acid dichloride, 5 parts of aluminum triethyl and 90 parts of benzene. 30 parts of butadiene-(1,3) are reacted at 40° to 50° C. over a period of two hours and there are obtained by working up as described above, 20 parts of cyclododecatriene-(1,5,9) and 5 parts of higher boiling oligomers of butadiene.

Example 16

A catalyst suspension is prepared from 0.5 part of chromium(VI) oxide, 0.4 part of acetyl chloride, 2.5 parts of aluminum triethyl and 50 parts of benzene. 25 parts of piperylene are added to the suspension and the temperature of the mixture is maintained at 60° C. for 60 hours. By working up in the manner described above there are obtained 15 parts of trimethylcyclododecatriene having a boiling point of 100° to 105° C. at 5 mm. Hg and a refractive index $n_D^{20}=1.4915$.

I claim:

1. A process for the production of oligomers of 1,3-dienes which comprises treating said dienes at −50° C. to 150° C. with a catalyst formed from (A) chromium (VI) oxide, (B) an organic acid anhydride, and (C) an aluminum organyl selected from the group consisting of dialkyl aluminum hydrides, aluminum trialkyls and aluminum triphenyl to produce oligomers of said dienes.

2. A process for the production of oligomers of 1,3-dienes which comprises treating said dienes at −50° C. to 150° C. with a catalyst formed from (A) chromium (VI) oxide, (B) an organic acid amide, and (C) an aluminum organyl selected from the group consisting of dialkyl aluminum hydrides, aluminum trialkyls and aluminum triphenyl to produce oligomers of said dienes.

References Cited in the file of this patent

UNITED STATES PATENTS

| | | |
|---|---|---|
| 2,504,016 | Foster | Apr. 11, 1950 |
| 2,768,961 | Weck et al. | Oct. 30, 1956 |
| 2,824,089 | Peters et al. | Feb. 18, 1958 |
| 3,088,985 | Wilke | May 7, 1963 |

FOREIGN PATENTS

| | | |
|---|---|---|
| 214,911 | Austria | May 10, 1961 |
| 559,257 | Canada | June 24, 1958 |
| 1,043,329 | Germany | Nov. 13, 1958 |
| 270,711 | Great Britain | Jan. 26, 1928 |

UNITED STATES PATENT OFFICE
CERTIFICATE OF CORRECTION

Patent No. 3,167,593                                    January 26, 1965

Herbert Mueller

It is hereby certified that error appears in the above numbered patent requiring correction and that the said Letters Patent should read as corrected below.

Column 5, line 40, for "0.08" read -- 0.8 --.

Signed and sealed this 13th day of July 1965.

(SEAL)
Attest:

ERNEST W. SWIDER                                   EDWARD J. BRENNER
Attesting Officer                                      Commissioner of Patents